Patented May 15, 1923.

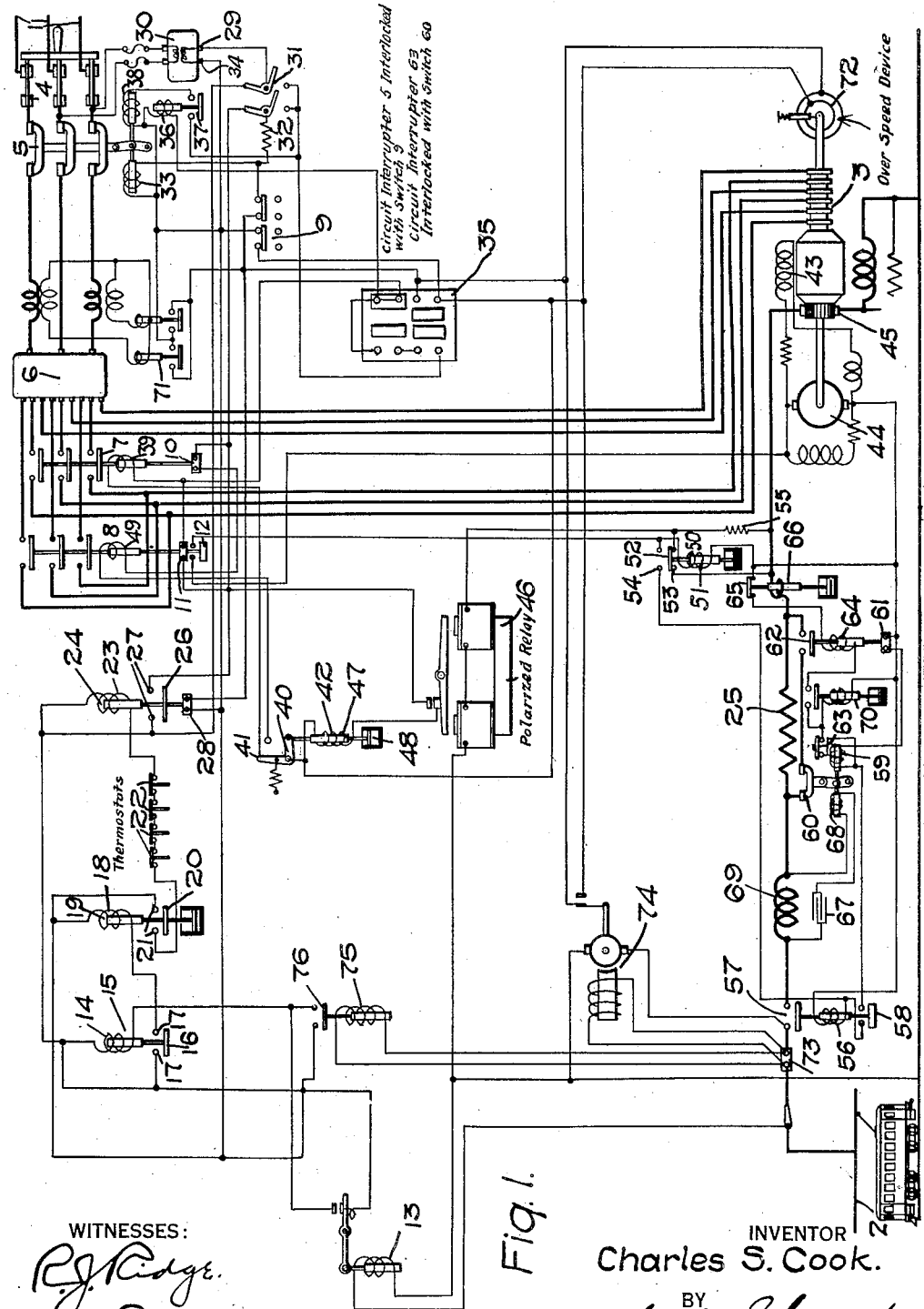

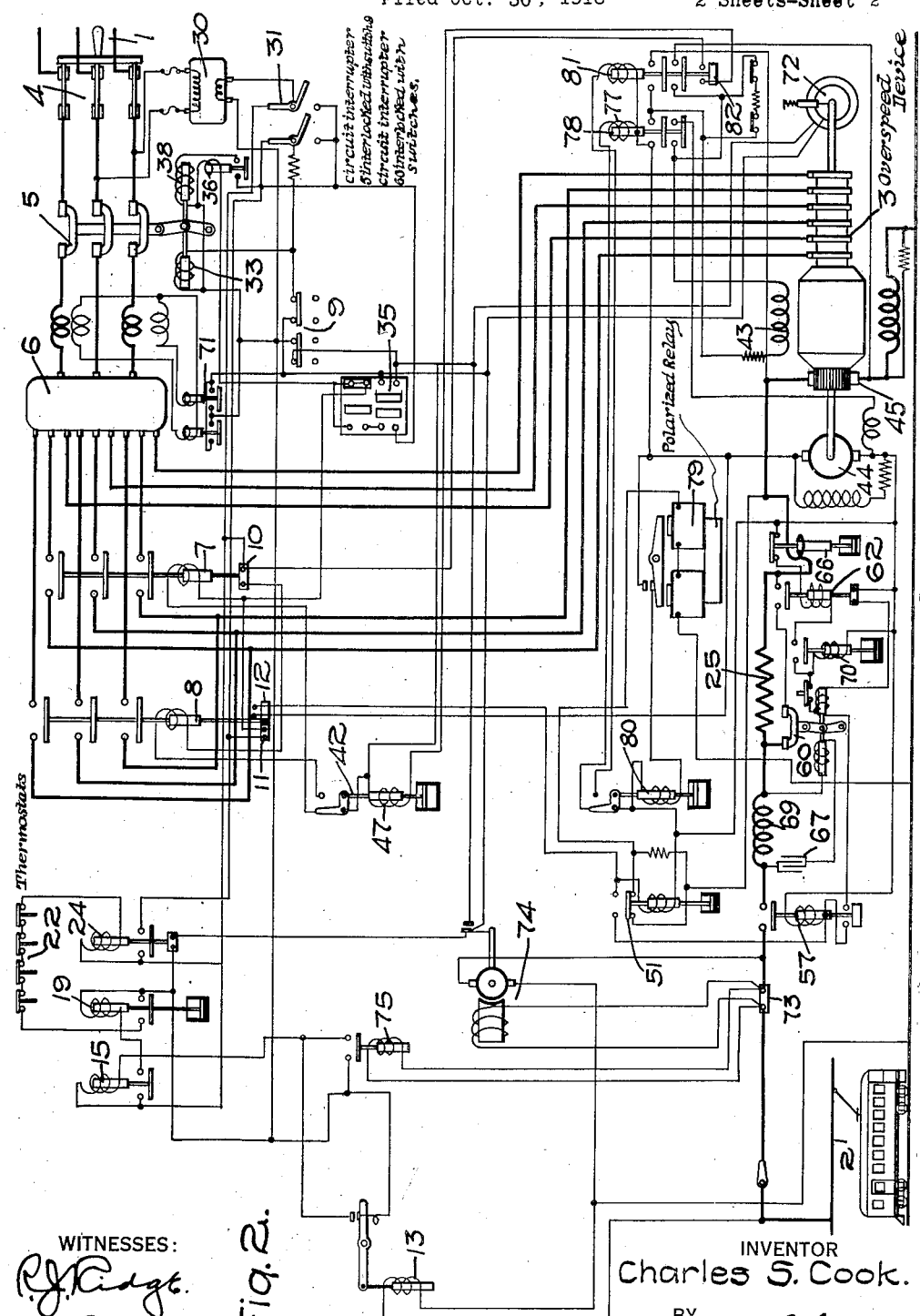

1,455,572

UNITED STATES PATENT OFFICE.

CHARLES S. COOK, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

Application filed October 30, 1916. Serial No. 128,434.

*To all whom it may concern:*

Be it known that I, CHARLES S. COOK, a citizen of the United States, and a resident of Pittsburgh, in the county of Allegheny and State of Pennsylvania, have invented a new and useful Improvement in Electrical Systems, of which the following is a specification.

My invention relates to electrical systems and particularly to such systems in which a rotary transformer such as a converter or other similar device is adapted to be automatically started and controlled for the purpose of supplying energy to a direct-current circuit under predetermined conditions.

One object of my invention is to provide a system of the above-indicated character that shall have means for operatively connecting a converter to a direct-current circuit a predetermined interval of time after alternating current of a predetermined potential is applied thereto.

Another object of my invention is to provide means whereby a converter that is adapted to be used in a system of the above-indicated character shall have a predetermined polarity under all conditions.

Another object of my invention is to provide means for limiting the current supplied by a converter in anticipation of a surge incident to a short-circuit or ground on the system.

A further object of my invention is to provide a system of the above-indicated character that shall be simple to construct and efficient in its operation.

United States Patent No. 1,435,229, issued November 14, 1922, to F. C. Hanker and C. M. Moss and assigned to the Westinghouse Electric and Manufacturing Company, discloses means for automatically starting and controlling the operation of a self-excited rotary converter by the use of a plurality of relay-controlled circuit interrupters.

Since a system of the above-indicated character requires means for determining the polarity of the converter before it is connected to the direct-current circuit, I provide a plurality of relay-controlled circuit interrupters for automatically starting a rotary converter that has an exciting generator so mechanically connected thereto that the polarity of the converter will be predetermined under all conditions. Thus, the converter may be connected to the direct-current circuit as soon as full alternating-current potential has been applied for a sufficient length of time to permit the converter to attain its full voltage and speed.

I further provide means whereby the current supplied to the direct-current circuit is limited in anticipation of a rush of current incident to a ground or short-circuit upon the direct-current circuit. Means is also provided whereby the converter may be made self-exciting after it has been started and has a definite polarity.

Fig. 1 of the accompanying drawings is a diagrammatic view of an electrical system embodying my invention, and Fig. 2 is a diagrammatic view of a modified form of electrical system embodying my invention.

An electrical system in which my invention is embodied comprises an alternating-current circuit 1, a direct-current circuit 2 and a rotary or synchronous converter 3 connected therebetween. It is frequently desirable to cause the converter 3 to be started and stopped in accordance with predetermined voltage and load conditions in the direct-current circuit 2. If the converter 3 is located a relatively great distance from the source of alternating current, it is desirable that the starting and stopping of the converter and the connection of the same to the direct-current circuit be accomplished by automatic means, and, in so doing, the overhead cost of operating the sub-station will be materially reduced. That is, if the converter 3 can be caused to operate only when a predetermined load is connected to the direct-current circuit 2, it will be understood that the only losses in the sub-station will obtain when the rotary converter is supplying energy.

The conductors of the circuit 1 are operatively connected, through a disconnecting switch 4 and a circuit interrupter 5, to the terminals of the primary winding of a transformer 6. The low-potential taps of the secondary winding of the transformer 6 are connected through a circuit interrupter 7 to the collector brushes of the converter 3, and, similarly, the relatively high-potential taps of the secondary winding of the transformer 6 are connected, through a circuit interrupter 8, to the collector brushes of the converter 3. Thus, when the interrupters 5 and 7 are closed, the alternating-current end of the rotary converter 3 will be supplied with alternating current of a relatively low potential, and, when the interrupter 7 is opened and the interrupter 8 is closed, the alternating-current end of the converter 3 will be supplied with alternating current at a relatively high or the correct operating potential.

The circuit interrupter 5 is provided with control or interlocking switches 9 so interlocked with the interrupter that, when the interrupter is closed, they will assume one position and when the interrupter is open, they will assume other positions. The interrupter 7 is provided with a control switch 10 that is adapted to be opened when the interrupter is closed, and the circuit interrupter 8 is provided with a control switch 11 and a control switch 12 that are so interlocked with the interrupter that, when the interrupter is closed, the control switch 11 is opened and the control switch 12 is closed and when the interrupter is opened, the switch 11 is closed and the switch 12 is opened.

A voltage-responsive relay 13 is connected across the direct-current circuit 2 for the purpose of causing the interrupter 5 to be closed when the voltage across the circuit 2 drops to a predetermined relatively low value. That is, if the circuit 2 represents a section of a direct-current railroad circuit, it is advisable to supply energy to that circuit only when a car or locomotive is traversing the same. Thus, when the locomotive is receiving energy from the circuit 2, the voltage thereacross will drop and the relay 13 will complete a circuit from one terminal 29 of an auxiliary transformer 30 through the winding 14 of a relay 15 to the other terminal 34 of the transformer which, through its contact members 16 and 17, completes a circuit through the winding 18 of a time-element relay 19 that is adapted to close quickly, when energized, and to open a predetermined length of time as, by way of illustration, three or four minutes after it has been de-energized. This time-element is introduced in order that the converter will not be shut down while a train is stopped to take on or discharge either passengers or freight. The relay 19 comprises a movable bridging contact member 20 and stationary contact members 21 which, when they are engaged, complete a circuit through a plurality of normally closed thermostats 22 and the operating winding 23 of a switch 24. The thermostats 22 may be located adjacent a limiting resistor 25 that is adapted to be connected between the converter 3 and the direct-current circuit 2, and they may also be disposed adjacent the bearings of the converter 3 or in the oil-containing receptacles of the transformer 6. The switch 24 is provided with a movable bridging contact member 26, stationary contact members 27 and a control switch 28 so mechanically interlocked therewith that, when the contact members 26 and 27 are engaged, the control switch 28 will be open.

When the switch 24 is closed, a circuit is completed from the terminal 29 of the auxiliary transformer 30 through a hand-operated transfer switch 31, a resistor 32 and the low-voltage release coil 33 on the circuit interrupter 5 to the other terminal 34 of the transformer 30. When the switch 24 is closed, another circuit is established which comprises the control switch 11 of the circuit interrupter 8, the contacts on a hand-operated controller 35 and the closing coil 36 of a relay 37. When the relay 37 is energized, it so connects the closing winding 38 of the circuit interrupter 5 to the terminals of the transformer 30 that the interrupter 5 is closed.

When the switch 24 is closed and the interlocking switch 9 is closed, a circuit is established that comprises the control switch 11 of the circuit interrupter 8, the actuating winding 39 of the circuit interrupter 7, the contact terminals 40 and 41 of a transfer relay 42 and the interlocking switches 9 of the circuit interrupter 5. Thus, the circuit interrupter 7 will be closed after the circuit interrupter 5 is closed, and a relatively low voltage will be impressed upon the converter to cause the same to start.

The shunt-field winding 43 of the converter 3 is operatively connected to the terminals of a compound wound generator 44 that is so mechanically driven by the converter 3 that the polarity of the direct-current end 45 of the converter 3 is predetermined and may be directly connected to the circuit 2 when the converter 3 reaches its state of synchronism.

When the converter 3 is in synchronism, a polarized relay 46, that is connected across the direct-current end 45 of the converter 3, is actuated to complete a circuit through the winding 47 of the transfer relay 42. The relay 42 is provided with a dash pot 48 in order that it may not operate, due to low frequency on the polarized relay 46, before the rotary converter 3 is in synchronism. That is, the relay 46 will oscillate under non-synchronous conditions, and it is only desirable to connect the converter to the circuit 2 when it operates in synchronism with the circuit 1, and, consequently, when the voltage does not oscillate.

When the relay 42 operates, it opens the circuit through the operating winding 39 of the switch 7 and completes a circuit through the interlocking switches 9, the closing coil 49 of the interrupter 8, the control switch 10 of the interrupter 7 and the contact members of the switch 24. Thus, the circuit interrupter 8 is closed, and full voltage is impressed on the converter 3. When the circuit interrupter 8 closes, a circuit is completed, through its control switch 12, from the positive terminals of the exciter generator 44 through the winding 50 of a relay 51 to the negative terminal of the generator 44. When the relay 51 is actuated, its bridging contact member 52 becomes disengaged from its stationary contact members 53 and engages its stationary contact members 54, and, in so doing, opens a closed-circuit connection around a resistor 55 for the purpose of inserting the same in series with the windings of the polarized relay 46, as full voltage is now impressed across the same. When the bridging contact member 52 engages the stationary contact members 54, a circuit is also completed from the positive terminal of the generator 44 through the control switch 12 of the interrupter 8 and through the closing winding 56 of a switch 57 to the negative terminal of the generator 44. The switch 57 is connected in series with the resistor 25 and is adapted to connect the direct-current end 45 of the converter 3 to the circuit 2.

When the switch 57 is closed, a circuit is completed through the control switch 12 of the interrupter 8, the contact members of the relay 51, the control switch 58 of the switch 57, the closing winding 59 of a quick-opening circuit interrupter 60 and the control switch 61 of a switch 62. Thus, the quick-opening interrupter 60 is closed and a circuit is completed from the positive terminal of the generator 44 through the control switch 12 of the interrupter 8, the contact members of the relay 51, the control switch 58 of the switch 57, the control switch 63 on the quick-opening interrupter 60, the contact members of a time-limit relay 70, the actuating winding 64 of the switch 62 and the contact members 65 of a time-limit overload relay 66 to the negative terminal of the exciter 44. Thus, the switch 62 is adapted to be closed a predetermined interval of time after the closure of the interrupter 60, as controlled by the relay 70. When the switch 62 closes, its control switch 61 opens the circuit through the closing winding 59 of the high-speed interrupter 60. The converter 3 is now connected to the direct-current circuit 2, with the resistance 25 closed-circuited by the switch 62 and the high-speed interrupter 60.

When a sudden overload, incident to a short circuit or ground, obtains on the circuit 2, a condenser 67, that is connected in series with the tripping coil 68, will discharge to quickly trip the interrupter 60. The circuit, comprising the condenser 67 and the tripping coil 68, is connected in shunt relation to a reactor 69 that is connected in series with the resistor 25 and the switch 57. Thus, when a short-circuit or ground occurs upon the circuit 2, a rush of current, incident thereto, will cause a sudden change in potential across the reactor 69 that will be sufficient to cause the discharge of the condenser 67. When the interrupter 60 is opened, the resistor 25 is connected in circuit with the converter 3 for the purpose of limiting the overload current to the circuit 2, thereby preventing flashover of the converter 3.

With ordinary overload conditions, the overload relay 66 will operate to cause its contact members 65 to open the circuit of the winding 64 of the switch 62. Since the operating winding 64 of the switch 62 is connected in circuit with the control switch 63 of the high-speed interrupter 60, it will be noted that the switch 62 will always open when the quick-opening interrupter 60 opens. The time-element relay 70 is inserted between the high-speed interrupter 60 and the switch 62 in order that a predetermined time may lapse between the closing of the high-speed interrupter 60 and the switch 62 to prevent chattering of either of these switches because of the lessening of the overload conditions by the resistor 25.

If the overload upon the circuit 2 persists and is not sufficiently reduced by the resistor 25, overload relays 71, that are connected to the alternating-current circuit 1, will operate to effect a closed-circuit connection across the terminals of the low-voltage trip coil 33 and thus open the circuit interrupter 5 which, in turn, will cause the converter 3 to stop. If the converter 3 exceeds its correct speed, an over-speed device 72 will operate to effect a closed-circuit connection across the terminals of the low-voltage trip coil 33 of the circuit interrupter 5 and, similarly, if the direction of energy traversing a shunt 73, that is connected in circuit with the resistor 25 and the switch 57, changes, a reverse-energy relay 74 will effect a closed-circuit connection across the terminals of the low-voltage trip coil 33 to cause the interrupter 5 to be tripped. When the interrupter 5 opens, the circuit from the terminal 34 of the transformer 30, through the interlocking switches 9 on the interrupter 5 and the relay 42, is opened, thereby de-energizing both the relay 42 and the circuit interrupter 8. When the interrupter 8 opens, the circuit through its control switch 12 opens to cause all switches that connect the converter to the circuit 2 to be opened.

A relay 75 is operatively connected to the current shunt 73 and is adapted to close its contact members 76, that are connected in parallel to the contacts of the relay 13, on low current, for example, ten per cent of normal. Thus, the operation of the relay 15 is dependent upon the current traversing the circuit 2 as well as upon the voltage of the circuit. If the locomotive leaves the zone that is supplied by the converter 3 and obtains its supply of energy from another source, the relay 75 will open, de-energizing the relay 15 providing the relay 13 has operated and the time-element relay 19 by which, after three to five minutes, according to the time setting thereof, the switch 24 will be de-energized. When the switch 24 opens, its control switch 28 will cause the circuit interrupter 5 to be opened by reason of the closed-circuit connection around the low-voltage trip coil 33 thereof. As hereinbefore stated, all of the relays are opened by the opening of the circuit 5 or by the opening of the switch 24.

The controller 35 is provided for non-automatically starting and controlling the operation of the converter 3, and the transfer switch 31 is provided for so connecting the controller 35 that it may be operated manually to control the operation of the converter 3. That is, when the switch 31 is moved into its lower position, the switches 14, 19 and 24 cannot operate. However, if the controller 35 is moved to the left, a circuit is completed from the terminal 29 of the transformer 30 through the switch 31, the contact members of the controller 35 and the coil 36 of the switch 37 to the terminal 34 of the transformer 30. This causes the closing coil 38 to be energized from the transformer 30, and, thus, the switch 5 is closed. After the switch 5 is closed, the interlocks 9 control the closing of the switch 7, substantially as hereinbefore set forth. The remaining operations are the same as in the automatic operation. If the controller 35 is thrown to the right, the coil 33 is short circuited to open the interrupter 5 and thus disconnect the station.

In Fig. 2 of the drawings, the converter 3 is adapted to be started, in the manner set forth with respect to Fig. 1 of the drawings, until the speed of the converter 3 is nearly up to this normal value. The voltage of the exciter generator 44 is proportional to the speed of the converter 3 and, when it is at substantially seventy-five per cent speed, enough voltage will be impressed on the winding 77 of a switch 78 to close the same. This connects the winding 43 across the exciter generator 44. When the converter is in synchronism, a polarized relay 79 will close a circuit from one terminal of the generator 44 through the winding of a transfer relay 80 which will operate to transfer, by opening the switch 78 and closing a switch 81, the field winding 43 from connection across the generator 44 to connection across the converter 3 itself. That is, the polarized relay 79 controls the excitation of the transfer switch 80, which causes the field winding 43 to be self-excited by the converter 3 instead of separately excited by the generator 44. In other words, when the relay 80 operates, the switch 78 will be opened and the switch 81 closed. The closure of the switch 81 connects the winding 43 directly across the direct-current end of the converter. When the switch 81 is closed, its control switch 82 completes a circuit through the winding 47 of the transfer switch 42 which closes the circuit interrupter 8, and the sequence of operation of the switches 57, 60 and 62 is the same as hereinbefore set forth with respect to Fig. 1 of the drawings. In other words, the system shown in Fig. 2 is substantially the same as that shown in Fig. 1 of the drawings with the exception that the added transfer relay 80 and the reversing switches 78 and 81 are provided for the purpose of changing the excitation of the field winding 43 of the converter from separate-excitation to self-excitation after the speed of the converter is substantially seventy-five per cent of its normal value.

I do not limit my invention to the particular structure or arrangement illustrated, as it may be variously modified without departing from the spirit and scope of the invention as set forth in the appended claims.

I claim as my invention:

1. The combination with a direct-current circuit and a rotary converter, of a resistor, means for connecting the resistor between the converter and the circuit, and means responsive to the current traversing the resistor for controlling the effectiveness of the resistor.

2. The combination with a direct-current circuit and a rotary converter, of a resistor, means for connecting the resistor between the converter and the circuit to limit the current that may traverse the circuit if a fault obtains on the circuit when the converter is connected to the circuit, and means for close-circuiting the resistor if less than a predetermined current traverses the resistor.

3. The combination with a converter, an alternating current circuit, a direct current circuit and means for starting the converter from the alternating current circuit in response to predetermined conditions in the direct-current circuit, of separate excitation means controlled by the converter for exciting the field winding of the converter to render the polarity thereof such that the converter may be automatically connected to the direct-current circuit without the necessity of determining the polarity of the converter.

4. The combination with a converter, an alternating current circuit, a direct-current circuit and means for starting the converter from the alternating current circuit in response to predetermined conditions in the direct-current circuit, of separate excitation means started simultaneously with the converter for exciting the converter to conform to the polarity of the direct-current circuit to which it is to be connected.

5. The combination with a direct-current circuit and a rotary converter, of a resistor, means for connecting the resistor between the converter and the circuit to limit the current that may traverse the circuit when conditions are such as to tend to permit the traversal of an excessive value of current and means for rendering the resistor ineffective while conditions are normal.

6. The combination with a direct-current circuit and a rotary converter, of a resistor, means for connecting the resistor between the converter and the circuit to limit the current that may traverse the circuit because of a difference of potential between the converter and the direct-current circuit and means responsive to the current between the converter and the direct-current circuit for rendering the resistor ineffective while the value of that current is less than a predetermined value.

7. The combination with an alternating-current circuit, a direct-current circuit and a rotary converter having a predetermined polarity, of means dependent upon the voltage of the direct-current end of the converter being unidirectional for connecting the converter to the direct-current circuit.

8. The combination with an alternating-current circuit, a direct-current circuit and a rotary converter having a predetermined polarity, of a polarized relay adapted to operate when the voltage of the direct-current end of the converter is unidirectional to control the connection of the converter to the direct-current circuit.

9. The combination with a converter, an alternating current circuit, a direct-current circuit and means for starting the converter from the alternating current circuit in response to predetermined conditions in the direct-current circuit, of separate excitation means controlled by the starting of the converter for exciting the converter to develop a predetermined polarity.

10. The combination with a converter, an alternating-current circuit, a direct-current circuit and means for starting the converter from the alternating-current circuit in response to conditions in the direct-current circuit, of a direct-connected compound-wound direct-current generator for exciting the shunt field winding of the converter to maintain its polarity such that the converter may be connected to the direct-current circuit without determining its polarity.

11. In a power-distributing system, the combination with a transmission circuit and an energy-translating apparatus for supplying energy to the circuit, of a current-limiting device connected between the apparatus and the circuit to preclude a surge of current between the apparatus and the circuit, and means for controlling the effectiveness of said current-limiting device comprising means responsive to the current traversing said device.

12. In a power-distributing system, the combination with a transmission circuit and an energy-translating apparatus and a current-limiting device, of means for automatically connecting the apparatus to the circuit through the current-limiting device under predetermined conditions, a switch for short-circuiting the current-limiting device, an operating coil for the switch, and means responsive to the current exchanged between the circuit and the apparatus for controlling the circuit of the operating coil.

13. In a power-distributing system, the combination with a transmission circuit and an energy-translating apparatus for supplying energy to the circuit, of a current-limiting device connected between the apparatus and the circuit to preclude a surge of current between the apparatus and the circuit when the apparatus is connected to the circuit, a switch for short-circuiting the current-limiting device, and overload means energized by the current traversing the current-limiting device for controlling the operation of the short-circuiting switch.

14. In an electrical power system, the combination with a distribution circuit, an energy-translating apparatus for supplying energy thereto, and means for connecting the apparatus to the circuit, of current-limiting means disposed between the apparatus and the circuit to limit the initial rush of current through the apparatus when the circuit is closed, means for subsequently rendering said current-limiting means ineffective if the current traversing the same is less than a predetermined value and means for maintaining the effectiveness thereof if the current exceeds a predetermined value.

15. The combination with a distribution circuit and an energy-translating apparatus, of current-limiting means, means for connecting said current-limiting means between the apparatus and the distribution circuit to limit the current that may traverse the circuit, when the apparatus is connected thereto, if conditions are such as to tend to permit the traversal of current of excessive value and means for subsequently rendering the current-limiting means ineffective.

16. The combination with an alternating-current circuit, a direct-current circuit and a rotary transformer provided with a field winding, of switching means for applying starting and running voltages to the transformer from the alternating-current circuit, voltage-responsive means connected to the direct-current end of the transformer for controlling the connection of the field winding thereto, means operative after the connection of the field winding to the transformer for controlling the switching means to transfer from starting to running condition, and means for controlling the connection of the transformer to the direct-current circuit comprising a resistor, a switching device for connecting the resistor between the transformer and the direct-current circuit, means controlled by the running switch for controlling the resistor-connecting switch, a switch for short-circuiting the resistor, an operating coil therefor and means responsive to the current exchanged between the transformer and the circuit for controlling the circuit of the operating coil.

17. The combination with an alternating-current circuit, a direct-current circuit and a rotary transformer for translating energy therebetween, of means for applying starting and running voltages to the transformer from the alternating-current circuit to establish an energy-translating condition therein, and means for connecting the transformer to the direct-current circuit comprising a resistor, a switch for connecting the resistor between the transformer and the circuit, a polarity-responsive device connected to the direct-current end of the transformer, means controlled by and cooperating with the running voltage means and the polarity-responsive device for controlling said resistor-connecting switch, a switch for short-circuiting the resistor and means controlled by the resistor-connecting switch for controlling said short-circuiting switch.

18. The combination with an alternating-current circuit, a direct-current circuit and a rotary transformer for translating energy therebetween, of means for applying starting and running voltages to the transformer from the alternating-current circuit to establish an energy-translating condition therein, and means for connecting the transformer to the direct-current circuit comprising a resistor, a switch for connecting the resistor between the transformer and the circuit, a polarity-responsive device connected to the direct-current end of the transformer, means controlled by, and cooperating with, the running-voltage means and the polarity-responsive device for controlling said resistor-connecting switch and a switch for subsequently short-circuiting the resistor.

19. The combination with an alternating-current circuit, a direct-current circuit and a rotary transformer for translating energy therebetween, of means for applying starting and running voltages to the transformer from the alternating-current circuit to establish an energy-translating condition therein, and means for connecting the transformer to the direct-current circuit comprising a resistor, a switch for connecting the resistor between the transformer and the circuit, means controlled by and cooperating with the running-voltage means for controlling said resistor-connecting switch, a switch for short-circuiting the resistor and means controlled by the resistor-connecting switch for controlling the short-circuiting switch.

20. The combination with an alternating-current circuit, a direct-current circuit and a rotary transformer for translating energy therebetween, of means for applying starting and running voltages to the transformer from the alternating-current circuit to establish an energy-translating condition therein, and means for connecting the transformer to the direct-current circuit comprising a resistor, a switch for connecting the resistor between the transformer and the circuit, means controlled by, and cooperating with, the running voltage means for controlling said resistor-connecting switch and a switch for subsequently short-circuiting the resistor.

21. The combination with an alternating-current circuit, a direct-current circuit and a rotary transformer for translating energy therebetween, of means for applying starting and running voltages to the transformer from the alternating-current circuit to establish an energy-translating condition therein, and means for connecting the transformer to the direct-current circuit comprising a resistor, a switch for connecting the resistor between the transformer and the circuit, a switch for short-circuiting the resistor, means electrically associated with the resistor and energized to a degree depending upon the value of current traversing the resistor, and means controlled by the running switch and cooperating with said last-mentioned means for controlling the operation of the short-circuiting switch.

22. The combination with an alternating-current circuit, a direct-current circuit and a rotary transformer for translating energy therebetween, of means for applying starting and running voltages to the transformer from the alternating-current circuit to establish an energy-translating condition therein, and means for connecting the transformer to the direct-current circuit comprising a resistor, a switch for connecting the resistor between the transformer and the circuit, a switch for short-circuiting the resistor, relay means connected to the resistor and so disposed as to be energized to a degree depending upon the value of current traversing the resistor, and means controlled by the running switch and cooperating with the said relay means for controlling the switch for short-circuiting the resistor.

23. The combination with an alternating-current circuit, a direct-current circuit and a rotary transformer for translating energy therebetween and provided with a shunt field winding, of means for applying starting and running voltages to the transformer from the alternating-current circuit, means connected to the direct-current end of the transformer for controlling the connection of the winding to said direct-current end of the transformer and for subsequently controlling the transfer from starting to running conditions, and means for subsequently controlling the connection of the direct-current end of the transformer to the direct-current circuit comprising a resistor, a switch for connecting the resistor between the transformer and the direct-current circuit, a switch for short-circuiting the resistor and means responsive to the value of current transferred between the transformer and the circuit for controlling the short-circuiting switch.

In testimony whereof, I have hereunto subscribed my name this 25th day of Oct., 1916.

CHARLES S. COOK.